US011657526B2

(12) United States Patent
Saitou et al.

(10) Patent No.: US 11,657,526 B2
(45) Date of Patent: May 23, 2023

(54) DISTANCE MEASUREMENT DEVICE

(71) Applicant: Panasonic Intellectual Property Management Co., Ltd., Osaka (JP)

(72) Inventors: Shigeru Saitou, Kyoto (JP); Akihiro Odagawa, Osaka (JP); Shinzo Koyama, Osaka (JP); Masato Takemoto, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/171,907

(22) Filed: Feb. 9, 2021

(65) Prior Publication Data
US 2021/0166410 A1    Jun. 3, 2021

Related U.S. Application Data

(63) Continuation of application No. PCT/JP2019/030024, filed on Jul. 31, 2019.

(30) Foreign Application Priority Data

Sep. 3, 2018 (JP) .............................. JP2018-164954

(51) Int. Cl.
*G01S 7/481* (2006.01)
*G01S 17/08* (2006.01)
*G06T 7/586* (2017.01)

(52) U.S. Cl.
CPC ............ *G06T 7/586* (2017.01); *G01S 7/4816* (2013.01); *G01S 17/08* (2013.01);
(Continued)

(58) Field of Classification Search
CPC ........... G06T 7/586; G06T 2207/10144; G06T 2207/10152; G06T 2207/30252; G01S 7/4816; G01S 17/08
See application file for complete search history.

(56) References Cited

U.S. PATENT DOCUMENTS

2004/0233416 A1* 11/2004 Doemens .............. G01S 7/4865
356/5.01
2005/0062710 A1*  3/2005 Kasai .................... G09G 3/3225
345/99
(Continued)

FOREIGN PATENT DOCUMENTS

CN        201703340 U  *  4/2010
CN        201703340 U  *  1/2011
(Continued)

OTHER PUBLICATIONS

International Search Report issued in corresponding International Patent Application No. PCT/JP2019/030024, dated Oct. 29, 2019, with English translation.

*Primary Examiner* — Zaihan Jiang
(74) *Attorney, Agent, or Firm* — McDermott Will & Emery LLP

(57) ABSTRACT

A distance measurement device includes: a light source configured to emit visible illumination light; an imaging element configured to receive reflected light of the illumination light from an object; and a signal processing circuit configured to reduce the emission of the illumination light in a predetermined period, detect a timing when the reception of the reflected light at the imaging element is reduced due to the reduction of the illumination light, and measure a distance to the object on the basis of the detected timing.

14 Claims, 12 Drawing Sheets

(52) U.S. Cl.
CPC ............... *G06T 2207/10144* (2013.01); *G06T 2207/10152* (2013.01); *G06T 2207/30252* (2013.01)

(56) References Cited

U.S. PATENT DOCUMENTS

| | | | |
|---|---|---|---|
| 2008/0151044 A1* | 6/2008 | Sawachi | H04N 13/239 |
| | | | 348/E13.067 |
| 2008/0152214 A1* | 6/2008 | Sawachi | H04N 13/25 |
| | | | 382/106 |
| 2011/0304842 A1 | 12/2011 | Kao et al. | |
| 2013/0228691 A1 | 9/2013 | Shah | |
| 2016/0161611 A1 | 6/2016 | Ito et al. | |
| 2016/0266253 A1 | 9/2016 | Kubota | |
| 2017/0127036 A1* | 5/2017 | You | H04N 23/56 |
| 2018/0053799 A1* | 2/2018 | Otani | G01S 17/89 |
| 2018/0135980 A1* | 5/2018 | Nakamura | G01S 17/10 |
| 2018/0247148 A1* | 8/2018 | Saitou | G06T 7/11 |
| 2018/0259647 A1 | 9/2018 | Takano et al. | |
| 2019/0072648 A1* | 3/2019 | Iwai | G01S 7/4808 |
| 2019/0079170 A1* | 3/2019 | Masuda | G01S 17/89 |

FOREIGN PATENT DOCUMENTS

| | | | | |
|---|---|---|---|---|
| JP | H07110432 A | * | 10/1993 | |
| JP | H07144889 A | * | 11/1993 | |
| JP | H07144889 A | * | 11/1993 | |
| JP | H07110432 A | * | 4/1995 | |
| JP | 2002262308 A | * | 3/2001 | |
| JP | 2002262308 A | * | 9/2002 | ............ G03B 15/03 |
| JP | 2013-183460 A | | 9/2013 | |
| JP | 2016-170114 A | | 9/2016 | |
| JP | 2017-138110 A | | 8/2017 | |
| WO | 2015/025497 A | | 2/2015 | |
| WO | 2017/085916 A1 | | 5/2017 | |

* cited by examiner

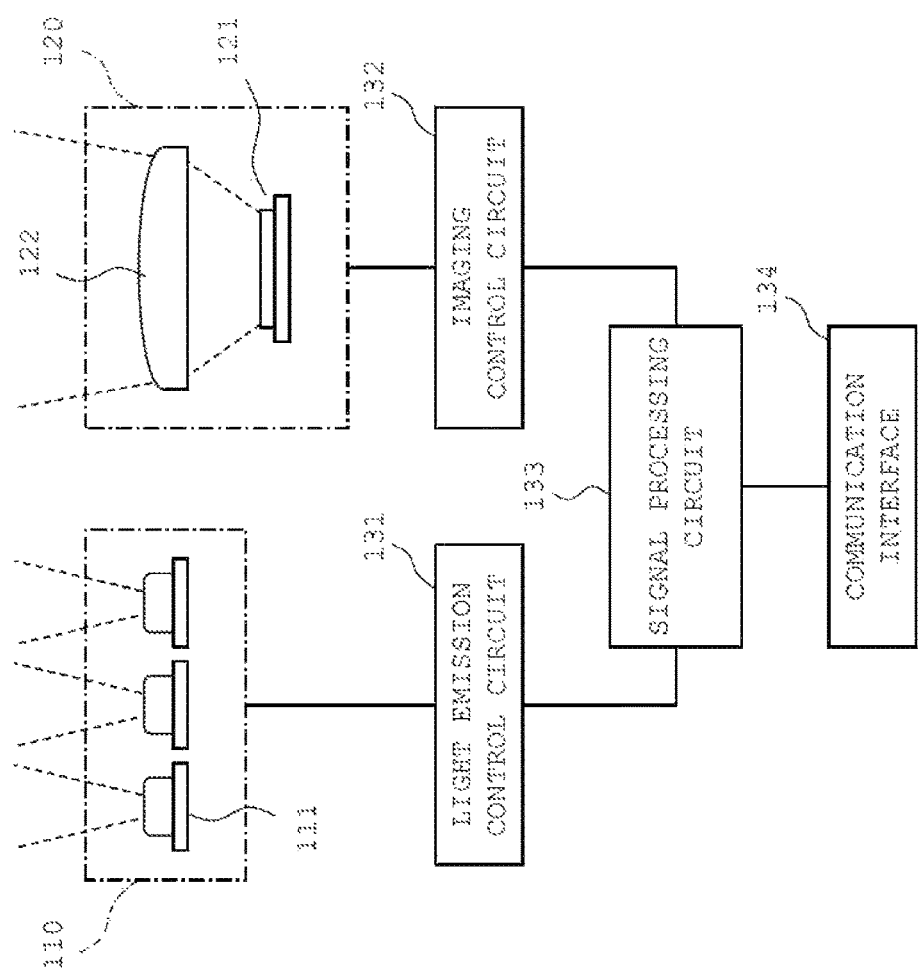
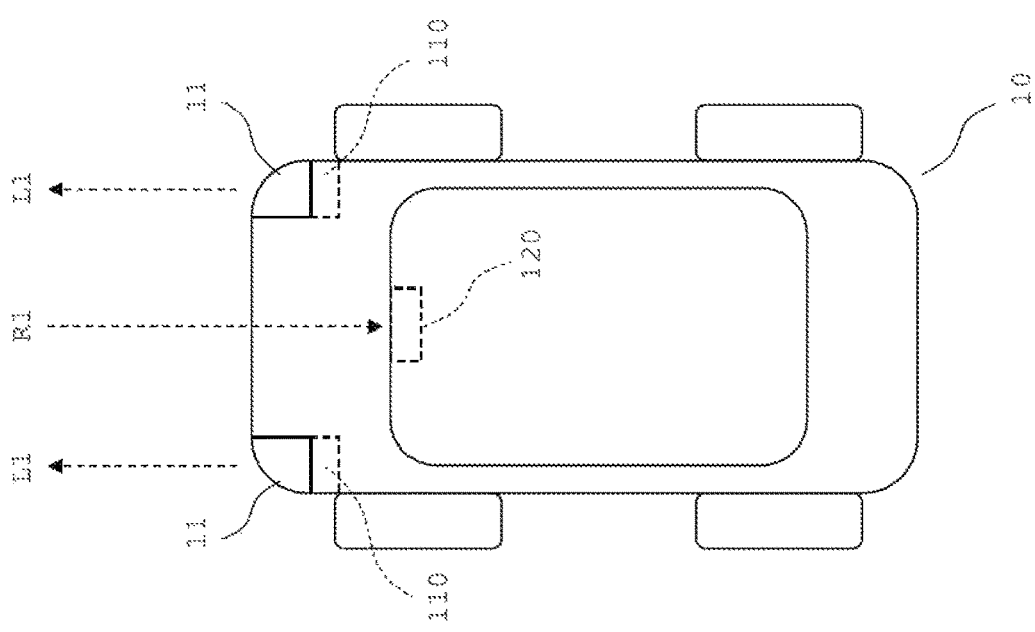

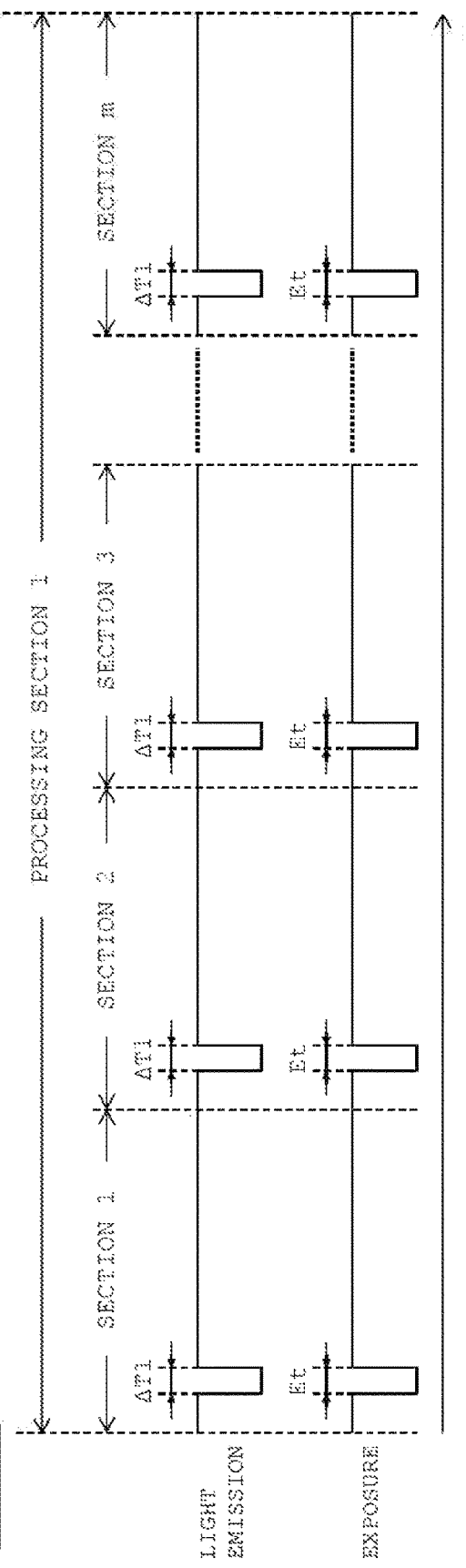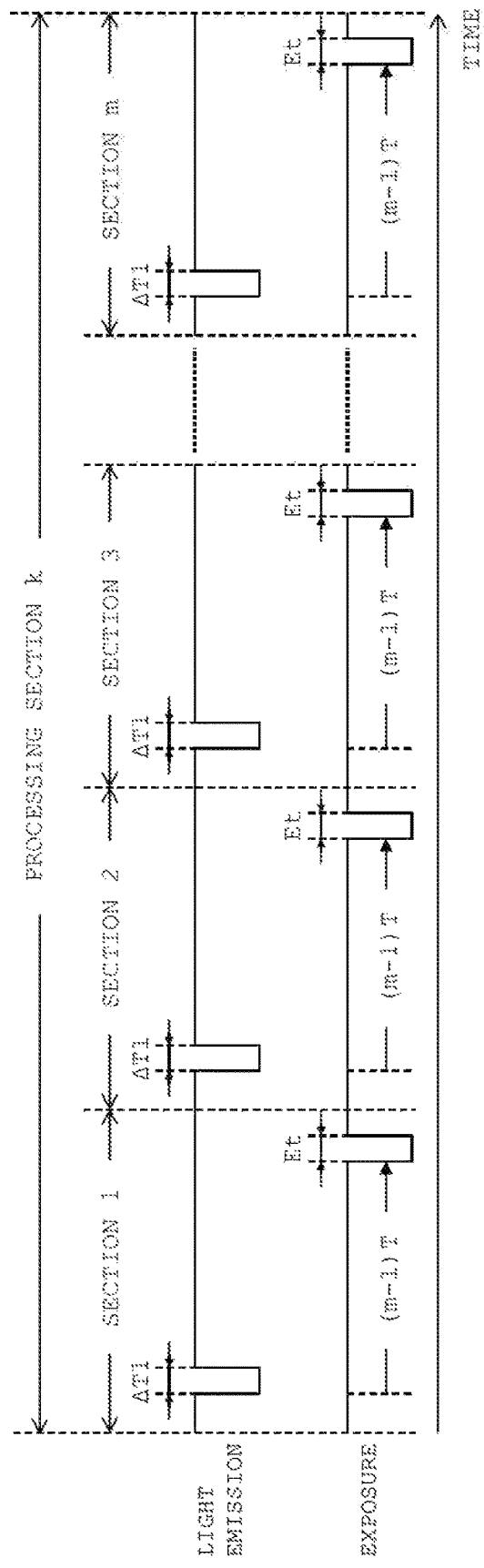

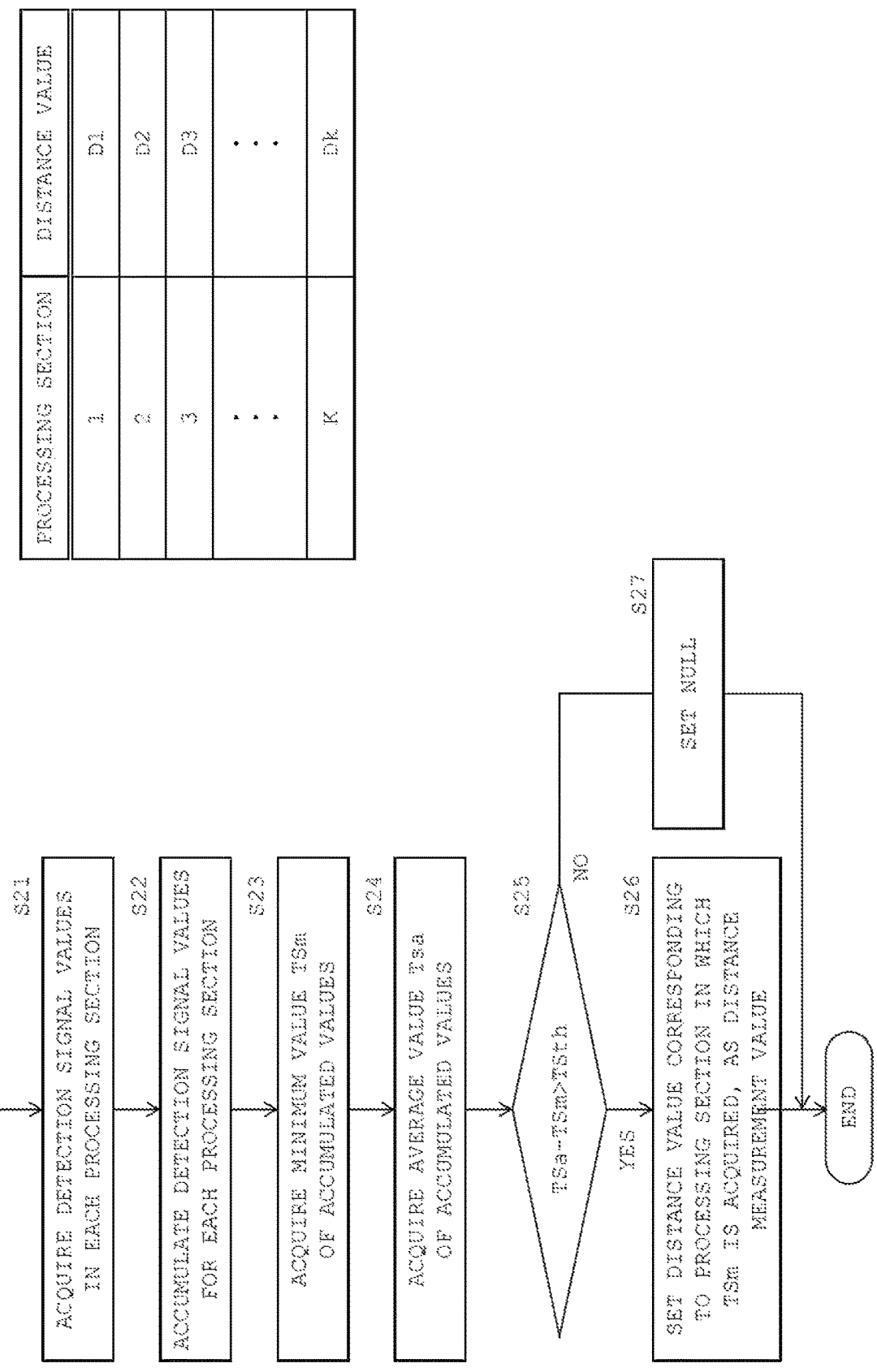

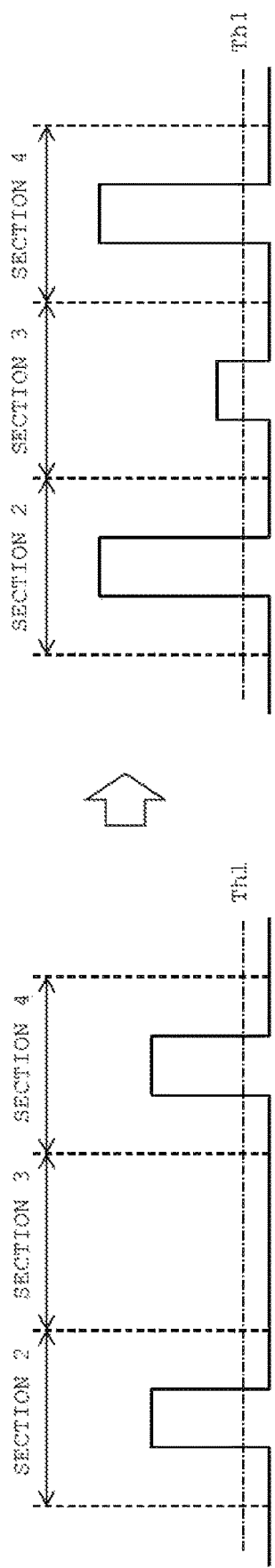
FIG. 10A NIGHT MODE
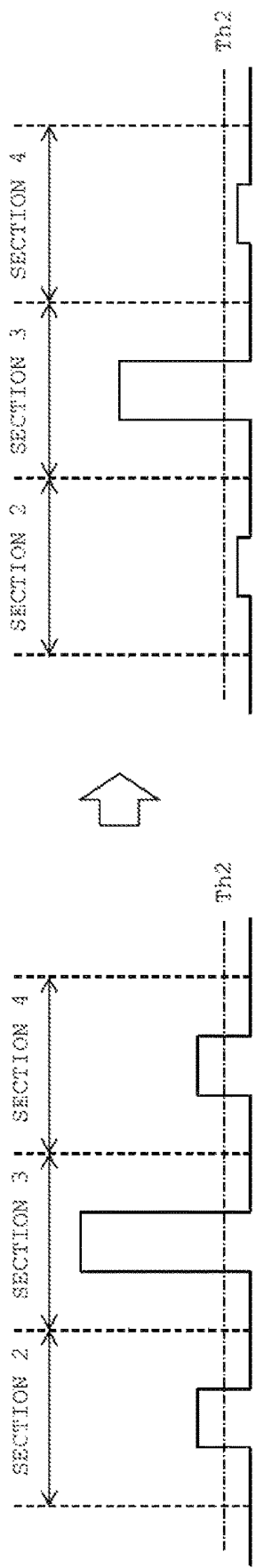
FIG. 10B DAYTIME MODE

DISTANCE MEASUREMENT DEVICE

CROSS REFERENCE TO RELATED APPLICATION

This application is a continuation of International Application No. PCT/JP2019/30024 filed on Jul. 31, 2019, entitled "DISTANCE MEASUREMENT DEVICE", which claims priority under 35 U.S.C. Section 119 of Japanese Patent Application No. 2018-164954 filed on Sep. 3, 2018, entitled "DISTANCE MEASUREMENT DEVICE". The disclosure of the above applications is incorporated herein by reference.

BACKGROUND OF THE INVENTION

1. Field of the Invention

The present invention relates to a distance measurement device that measures the distance to an object using light and that is, for example, suitable to be used for a headlight of a vehicle.

2. Disclosure of Related Art

To date, studies have been made on use of the light emitted from a headlight or the like as light for distance measurement. For example, International Publication No. WO2015/025497 describes a distance measurement system which projects illumination light to illuminate the front of a vehicle and receives reflected light thereof with an imaging unit to measure the distance to an object that exists in front of the vehicle. In this system, an illumination mode for illuminating the front and a distance measurement mode for measuring a distance are repeatedly executed in a time-division manner. In the distance measurement mode, light is emitted in a pulsed manner at a short time interval, and the distance to an object is measured by the TOF (Time Of Flight) method on the basis of the reception timing of the reflected light.

According to this configuration, after light is emitted in a pulsed manner in the distance measurement mode, projection of light is stopped for distance measurement until the illumination mode is started. Therefore, the duty during the period in which the illumination light is applied may decrease, and the amount of the illumination light applied may be insufficient.

SUMMARY OF THE INVENTION

A distance measurement device according to a main aspect of the present invention includes: a light source configured to emit illumination light including visible light; a photodetector configured to receive reflected light of the illumination light from an object; and a signal processing circuit configured to reduce the emission of the illumination light in a predetermined period and measure a distance to the object on the basis of a timing when the reception of the reflected light at the photodetector is reduced due to the reduction of the illumination light.

In the distance measurement device according to the aspect, since the timing in which the reception of the reflected light is reduced due to the reduction of the illumination light is detected and the distance to the object is measured, a period in which the illumination light is reduced for distance measurement can be reduced to be a short period. Thus, distance measurement can be performed smoothly while applying a sufficient amount of the illumination light (according to the eye-safe standard IEC60825-1).

BRIEF DESCRIPTION OF THE DRAWINGS

The above and other objects and new features of the present invention will be fully clarified by the following description of the embodiment, when read in conjunction with accompanying drawings.

FIG. 1A is a diagram schematically showing an installation state of light sources and a camera of a distance measurement device with respect to a vehicle, according to Embodiment 1;

FIG. 1B is a diagram showing a configuration of the distance measurement device according to Embodiment 1;

FIG. 6A and FIG. 6B are each a timing chart showing light emission control of the light source and exposure control of the imaging element according to Embodiment 2 in more detail;

FIG. 7A is a flowchart showing a distance measurement process according to Embodiment 2;

FIG. 7B is a diagram showing a configuration of a table which is referred to in distance measurement according to Embodiment 2;

FIG. 10A is a diagram schematically showing change of a detection signal when the surroundings become bright in a situation where a night mode is set, according to Embodiment 3;

FIG. 10B is a diagram schematically showing change of a detection signal when the surroundings become dark in a situation where a daytime mode is set, according to Embodiment 3;

Figure 2B:
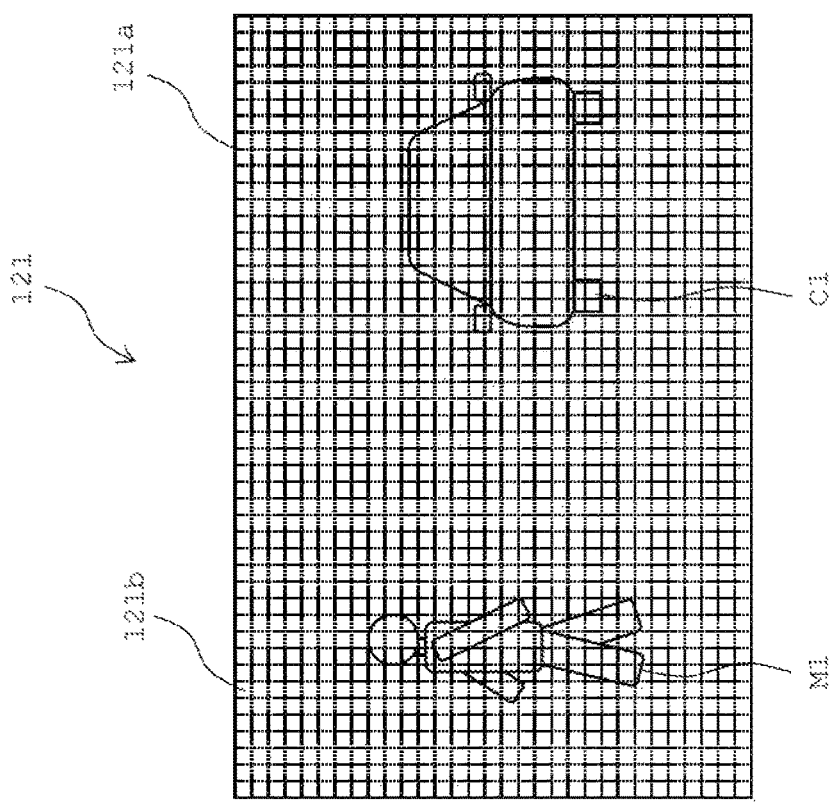
FIG. 2B is a diagram schematically showing an image projected on the light receiving surface of the imaging element according to Embodiment 1.

It should be noted that the drawings are solely for description and do not limit the scope of the present invention by any degree.

DESCRIPTION OF THE PREFERRED EMBODIMENTS

Hereinafter, embodiments of the present invention will be described with reference to the drawings. In each embodiment, a configuration example in the case where a distance measurement device is mounted on a vehicle is shown.

Embodiment 1

FIG. 1A is a diagram schematically showing an installation state of light sources 110 and a camera 120 of a distance measurement device 100 with respect to a vehicle 10, according to Embodiment 1.

As shown in FIG. 1A, in the present embodiment, the light sources 110 are installed as light sources of headlights 11 of the vehicle 10. Each light source 110 emits visible light such as white light as illumination light L1 to the front of the vehicle 10. Accordingly, the front of the vehicle 10 is illuminated. The camera 120 receives reflected light R1 of the illumination light L1 reflected by an object that exists in front of the vehicle 10, and takes an image of the front of the vehicle. The camera 120 is installed, for example, near a rear-view mirror in the vehicle. The installation position of the camera 120 is not limited thereto, and may be another position as long as it is possible to receive the reflected light R1 and take an image of the front of the vehicle.

FIG. 1B is a diagram showing a configuration of the distance measurement device 100. In FIG. 1B, for convenience, only one of the two light sources 110 is shown, and the other light source 110 is not shown. The other light source 110 also has the same configuration as the light source 110 shown in FIG. 1B.

In addition to the light sources 110 and the camera 120, the distance measurement device 100 includes a light emission control circuit 131, an imaging control circuit 132, a signal processing circuit 133, and a communication interface 134 as components of a circuitry.

The light source 110 includes a plurality of LEDs (light emitting diodes) 111. Each LED 111 emits white light. The LEDs 111 do not have to emit light of the same color, and may emit light of different colors. In this case, visible light of a predetermined color is generated by mixing the light of the respective colors. Although the three LEDs 111 are shown in FIG. 1B, the number of LEDs 111 disposed in one light source 110 is not limited thereto.

Moreover, instead of the LEDs 111, another light-emitting element such as a halogen lamp or a semiconductor laser may be used. In addition, a wavelength conversion element that generates visible light such as white light from light having a predetermined wavelength may be used. Furthermore, an optical system for guiding the light emitted from the LEDs 111, as the illumination light L1, to the front of the vehicle 10 may be provided to the light source 110. This optical system may include a lens or the like that converges the illumination light L1 into parallel light or light that slightly spreads from parallel light.

The camera 120 includes an imaging element 121 and an imaging lens 122. The imaging element 121 is a CMOS (complementary metal oxide semiconductor) image sensor, a CCD (Charge Coupled Device) image sensor, or the like. The imaging lens 122 condenses the reflected light R1 on a light receiving surface of the imaging element 121.

A filter that allows light in the wavelength band of the illumination light L1 emitted from the light source 110 to pass therethrough and that blocks light in the other wavelength bands may be disposed on the front side of the imaging element 121 (for example, between the imaging lens 122 and the imaging element 121). For example, in the case where the plurality of LEDs 111 emit light having different wavelengths, a filter that allows only light of any one of these wavelengths to pass therethrough may be disposed on the front side of the imaging element 121. Accordingly, unnecessary light other than the reflected light R1 can be inhibited from being incident on the imaging element 121.

The light emission control circuit 131 controls the LEDs 111 of the light source 110 on the basis of instructions from the signal processing circuit 133. The light emission control circuit 131 performs the same control on the two light sources 110. The imaging control circuit 132 controls the imaging element 121 of the camera 120 on the basis of instructions from the signal processing circuit 133.

The signal processing circuit 133 controls the LEDs 111 and the imaging element 121 via the light emission control circuit 131 and the imaging control circuit 132 in order to perform distance measurement while applying the illumination light L1. The signal processing circuit 133 includes an internal memory used as a work area in distance measurement. The signal processing circuit 133 transmits distance data acquired through distance measurement, to a circuitry on the vehicle 10 side via the communication interface 134.

Here, the signal processing circuit 133 measures a distance for each pixel of the imaging element 121 on the basis of a received state of the reflected light at each pixel, and transmits the measurement result (distance data) of each pixel to the circuitry on the vehicle 10 side.

Figure 2A:
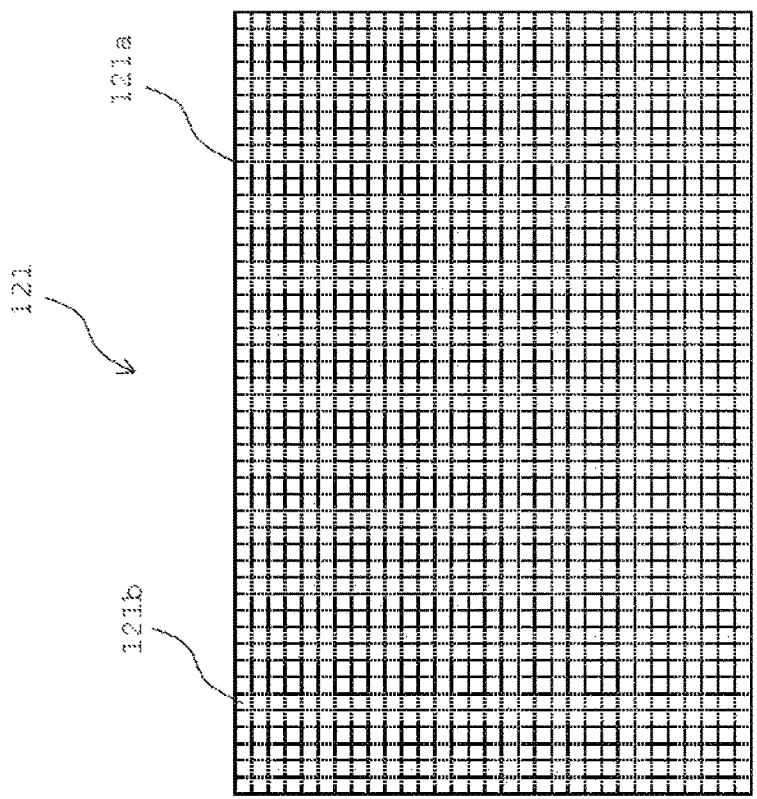
FIG. 2A is a diagram schematically showing a light receiving surface of an imaging element according to Embodiment 1.

FIG. 2A is a diagram schematically showing a light receiving surface 121a of the imaging element 121. FIG. 2B is a diagram schematically showing an image projected on the light receiving surface 121a of the imaging element 121.

As shown in FIG. 2A, pixels 121b are arranged in a matrix on the light receiving surface 121a of the imaging element 121. Each pixel 121b forms a detection region for detecting the reflected light R1. For example, an image as shown in FIG. 2B is projected on the light receiving surface 121a by the imaging lens 122. Here, an image C1 of an oncoming vehicle and an image M1 of a pedestrian are projected on the light receiving surface 121a. In this case, the reflected light R1 is incident on the pixels 121b that overlap the regions of the images C1 and M1.

The signal processing circuit 133 shown in FIG. 1B measures the distance to an object for each pixel 121b on the basis of an incident state of the reflected light R1 on each pixel 121b. In the example of FIG. 2B, the signal processing circuit 133 acquires the distance to the pedestrian for the pixels 121b that the image M1 of the pedestrian overlaps, and acquires the distance to the oncoming vehicle for the pixels 121b that the image C1 of the oncoming vehicle overlaps. For the pixels 121b that the images M1 and C1 do not overlap, a distance is not acquired. NULL indicating infinity is assigned as distance data to these pixels 121b. The signal processing circuit 133 transmits the distance data for one frame acquired for each pixel 121b, to the circuitry on the vehicle 10 side via the communication interface 134.

Next, a distance data acquisition process performed by the signal processing circuit 133 will be described.

Figure 3:
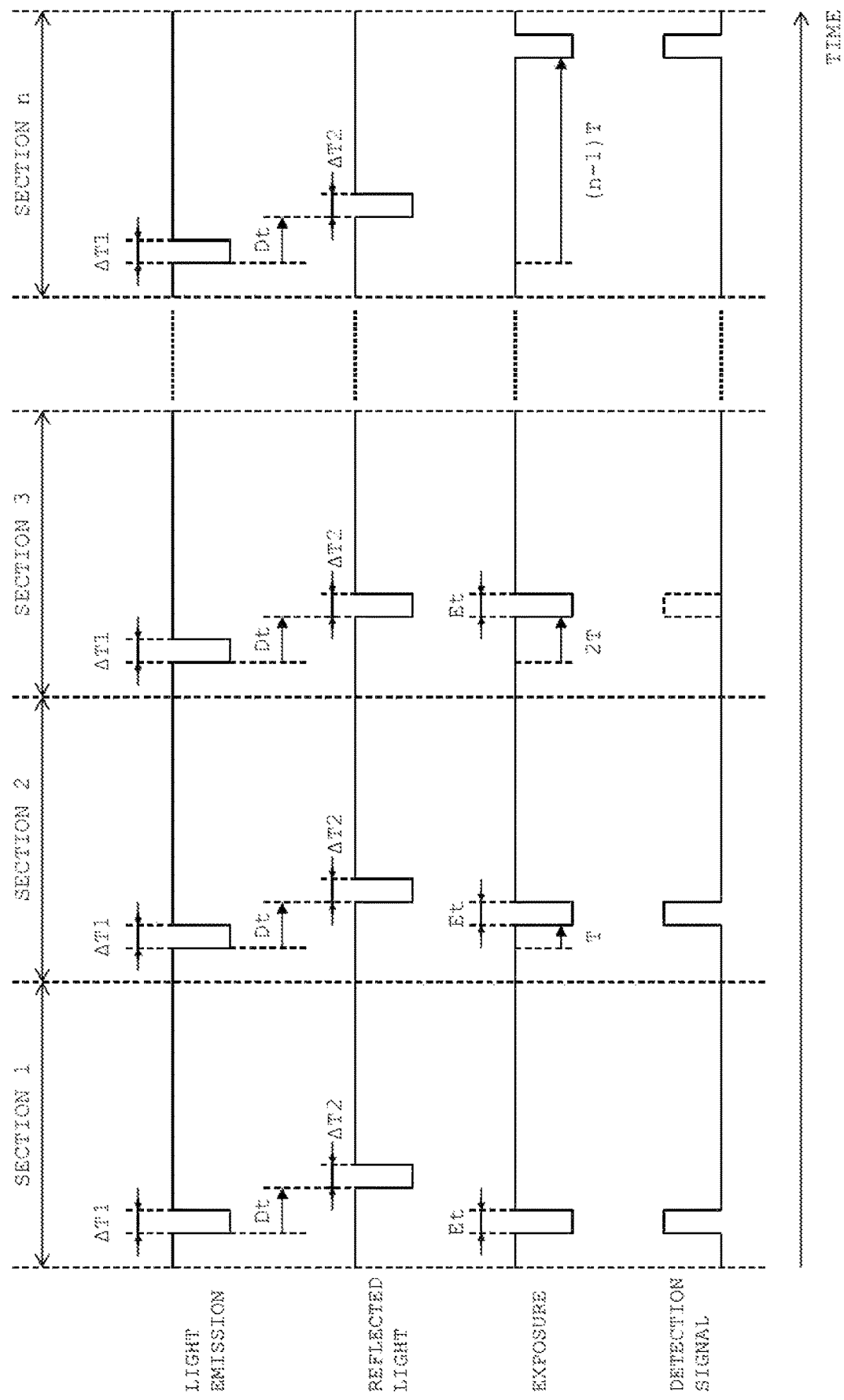
FIG. 3 is a timing chart illustrating light emission control of the light source and exposure control of the imaging element according to Embodiment 1.

FIG. 3 is a timing chart illustrating light emission control of the light source 110 (LEDs 111) and exposure control of the imaging element 121.

In order to acquire distance data of each pixel 121b, n consecutive sections are set on the time axis. The time width of each section is the same. The time width of each section is, for example, about 10 μsec.

The top chart of FIG. 3 shows a drive signal for the light source 110 (LEDs 111). When the drive signal is at a high level, the light source 110 is driven, and the illumination light L1 is emitted from the light source 110. When the drive signal is at a low level, the emission of the illumination light L1 is reduced. In the present embodiment, when the drive signal is at the low level, the emission of the illumination light L1 is reduced such that the emission of the illumination light L1 does not occur. That is, in the present embodiment, when the drive signal is at the low level, the light source 110 is stopped, and the illumination light L1 is not emitted from the light source 110.

The signal processing circuit 133 lowers the drive signal to the low level for a stop period ΔT1 at the timing when a fixed time elapses from the start of each section. The stop period ΔT1 is, for example, about 10 nsec. The stop period ΔT1 is set at the timing of the fixed time from the start of each section as described above. Therefore, the cycle of the stop period ΔT1 is the same as the cycle of the section.

When an object exists in the projection region of the illumination light L1, the reflected light R1 from the object is condensed on the imaging element 121. Here, the reflected light R1 is incident on the pixels 121b on which an image of the object is projected, at a delay time corresponding to the distance to the object. At this time, the reflected light R1 is missing at the reception timing of the imaging element 121 corresponding to the stop period ΔT1.

The second chart from the top of FIG. 3 shows the amount of the reflected light R1 at the pixels 121b on which the image of the object is projected. The amount of the reflected light R1 is missing during a missing period ΔT2 at the timing delayed from the stop period ΔT1 by a delay time Dt corresponding to the distance to the object. The time width of the missing period ΔT2 is substantially equal to that of the stop period ΔT1. The time difference between the stop period ΔT1 and the missing period ΔT2, that is, the delay time Dt corresponding to the distance to the object, can be acquired by detecting the timing of the missing period ΔT2. Accordingly, the distance to the object can be detected at the position of each pixel 121b.

In order to detect the timing of the missing period ΔT2, the signal processing circuit 133 controls exposure of each pixel 121b as follows.

The third chart from the top of FIG. 3 shows an exposure timing of the imaging element 121. In a period (exposure period Et) in which the waveform falls to a low level, exposure is performed on each pixel 121b. The exposure period Et is, for example, about 10 nsec. The start timing of the exposure period Et is different for each section. That is, the exposure period Et in each section is delayed by a time width T from the exposure period Et in the section immediately before that section. For example, the start timing of the exposure period Et in section 2 is delayed by the time width T with respect to the exposure period Et in section 1, and the start timing of the exposure period Et in section 3 is delayed by a time width 2T with respect to the exposure period Et in section 1.

Here, the time width T is set, for example, to be the same as that of the exposure period Et. Accordingly, the time positions of the exposure periods Et with respect to the stop periods ΔT1 do not overlap each other between the sections. It should be noted that the time width T does not necessarily have to be set to be the same as that of the exposure period Et, and, for example, the time width T may be set to be shorter than that of the exposure period Et.

The exposure period Et in section 1 is set at the position on the time axis at which the missing period ΔT2 occurs when the object is at the minimum distance of a distance range (distance measurement range) for which distance measurement is to be performed. For example, the exposure period Et in section 1 is set at the time position delayed from the stop period ΔT1 in section 1 by a time corresponding to the minimum distance of the distance measurement range. The exposure period Et in section n is set at the time position delayed from the stop period ΔT1 in section n by a time corresponding to the maximum distance of the distance measurement range.

When the exposure period Et in each section is set as described above, the exposure period Et in one of the sections and the missing period ΔT2 of the reflected light R1 match each other. That is, when the object exists at the position corresponding to each pixel 121b, the exposure period Et and the missing period ΔT2 of the reflected light R1 match each other in the section in which the exposure period Et is set at the position, on the time axis, corresponding to the distance to the object, and the exposure period Et and the missing period ΔT2 of the reflected light R1 do not match each other in the other sections.

Here, in the section in which the exposure period Et matches the missing period ΔT2, the reflected light R1 is not incident on the pixel 121b, so that a detection signal of the pixel 121b based on the reflected light R1 is not generated. On the other hand, in each of the sections in which the exposure period Et does not match the missing period ΔT2, the reflected light R1 is incident on the pixel 121b, so that a detection signal of the pixel 121b based on the reflected light R1 is generated.

For example, in the example of FIG. 3, the exposure period Et in section 3 matches the missing period ΔT2 of the reflected light R1, and the exposure period Et in each of the other sections does not match the missing period ΔT2 of the reflected light R1. In this case, as shown in the bottom chart of FIG. 3, a detection signal of the pixel 121b is not generated in section 3 in which the exposure period Et matches the missing period ΔT2, and a detection signal of the pixel 121b is generated in the other sections.

Here, the exposure period Et in section 3 is delayed by the time width 2T from the stop period ΔT1 in section 3. The time width 2T matches the delay time Dt of the reflected light R1. That is, the time width 2T corresponds to the distance to the object. Therefore, the time width 2T can be grasped by specifying section 3 in which a detection signal has not been obtained, and thus the distance to the object can be obtained.

In the present embodiment, a table in which a section and a distance are associated with each other is stored in advance in the signal processing circuit 133. Accordingly, it is not necessary to calculate the distance to the object on the basis of the time widths T, 2T, . . . , (n−1)T of the respective sections, and the process can be simplified. The signal processing circuit 133 specifies a section in which a detection signal has not been obtained, among sections 1 to n, and acquires the distance associated with the specified section from the table. The distance acquired thus is set in the distance data of the pixel 121b to be processed.

The processing for sections 1 to n is repeatedly executed while the distance measurement operation continues. A rest period having a predetermined time length may be set when shifting to the next processing for sections 1 to n. In this case, the illumination light L1 may be continuously emitted in the rest period. Furthermore, in the rest period, a distance measurement process based on the detection signal of each pixel 121b acquired in the immediately preceding sections 1 to n may be performed. The total number of sections 1 to n is set on the basis of the maximum distance of the distance measurement range and the resolution of a distance value.

FIG. 4A is a flowchart showing a distance measurement process. FIG. 4B is a diagram showing a configuration of a table which is referred to in distance measurement. The flowchart of FIG. 4A is executed for each pixel 121b.

In control in section 1 to section n, the signal processing circuit 133 acquires the detection signal values of each pixel 121b in the respective sections, and stores the acquired detection signal value in the internal memory. Thereafter, the signal processing circuit 133 acquires the detection signal values in the respective sections for each pixel 121b from the memory (S11), and acquires a minimum value Sm of the acquired detection signal values (S12). Furthermore, the signal processing circuit 133 acquires an average value Sa from the detection signal values other than the minimum value Sm (S13), and determines whether the difference between the average value Sa and the minimum value Sm is greater than a threshold Sth (S14).

When the difference between the average value Sa and the minimum value Sm is greater than the threshold Sth (S14: YES), the signal processing circuit 133 determines the timing of exposure in the section in which the minimum value Sm is acquired as the timing when the reception of the reflected light R1 is missing, and acquires a distance value to the object (S15). Here, the table shown in FIG. 4B in which sections 1 to n and distance values D1 to Dn are associated with each other is stored in advance in the signal processing circuit 133. In the process in step S15, the signal processing circuit 133 reads the distance value corresponding to the section in which the minimum value Sm is acquired, from the table, and sets the acquired distance value as a distance value of the pixel 121b to be processed.

On the other hand, when the difference between the average value Sa and the minimum value Sm is equal to or less than the threshold Sth (S14: NO), the signal processing circuit 133 sets NULL indicating infinity, for the pixel 121b to be processed (S16). Then, one cycle of the distance measurement process is completed. When detection signal values are acquired for the next section 1 to section n, the signal processing circuit 133 returns the process to step S11 and executes the same process.

The distance values for one frame acquired for each pixel 121b by the process of FIG. 4A are transmitted to a control unit on the vehicle 10 side via the communication interface 134 every cycle. The control unit on the vehicle 10 side performs predetermined control on the vehicle 10 on the basis of the received distance values.

Effects of Embodiment 1

According to Embodiment 1, the following effects are achieved.

As described with reference to FIG. 3, the distance to the object is measured on the basis of the timing when the reflected light R1 is missing due to stop of the illumination light L1. Thus, a period (stop period ΔT1) in which the illumination light L1 is stopped for distance measurement can be reduced to be a short period, and the duty of the period in which the illumination light L1 is emitted can be increased. Therefore, distance measurement can be smoothly performed while applying a sufficient amount of the illumination light L1. It should be noted that the duty may be read as an emission density.

The imaging element 121 is used as a photodetector for receiving the reflected light R1, and the signal processing circuit 133 performs distance measurement based on the reception of the reflected light R1 being missing, for each pixel 121b of the imaging element 121. Accordingly, the distance to an object that exists in the irradiation region of the illumination light L1 can be acquired with high spatial resolution.

As described with reference to FIG. 3, the signal processing circuit 133 stops the emission of the illumination light L1 at a fixed timing in each of sections 1 to n each having a predetermined cycle, changes the timing of exposure of each pixel 121b in each of sections 1 to n, and measures the distance to the object for each pixel 121b of the imaging element 121 on the basis of the value of the detection signal outputted from each pixel 121b in each of sections 1 to n as a result of the exposure.

By using the exposure control on each pixel 121b for distance measurement as described above, the distance value of each pixel can be acquired more smoothly by a simple process.

As shown in FIG. 4A, the signal processing circuit 133 determines the section in which one signal value that is the smallest and deviates from the other signal values is acquired, as the section in which the reception of the reflected light R1 is missing, and measures the distance to the object. Specifically, the signal processing circuit 133 determines the section in which one signal value that is the smallest and whose difference from the average value of the other signal values exceeds a predetermined threshold is acquired, as the section in which the reception of the reflected light R1 is missing, and measures the distance to the object. Accordingly, the section in which the signal value accidentally becomes a minimum value due to the influence of noise or the like can be inhibited from being erroneously detected as the section corresponding to the missing timing of the reflected light R1. Therefore, the distance to the object can be measured more accurately.

In the process of FIG. 4A, whether the minimum value Sm of the detection signal values deviates from the other detection signal values is determined using the average value Sa of the other detection signal values, but the determination of deviation may be performed using another value. For example, whether the minimum value Sm deviates from the other detection signal values may be determined by comparing the minimum value Sm with the average value of some of the other detection signal values. In addition, the threshold Sth may be set to a value with which it can be appropriately determined that the minimum value Sm is generated due to missing of the reflected light R1.

Embodiment 2

In Embodiment 1 described above, a combination of the stop period ΔT1 and the exposure period Et delayed from the stop period ΔT1 by a time corresponding to the distance value is set once per cycle. On the other hand, in Embodiment 2, this combination is set a plurality of times in one cycle. Then, detection signal values acquired in each of the exposure periods Ets of the plurality of times are accumulated, and the accumulated values are compared to acquire a distance value.

That is, in Embodiment 2, exposure is performed on the pixel 121b a plurality of times at the same exposure timing, and the accumulated value of signal values acquired as a result of the respective exposures of the plurality of times is used as a value indicating the magnitude of a signal at the same exposure timing. Then, when the accumulated value is a minimum value and deviates from other accumulated values, distance measurement is performed with the exposure timing when the accumulated value is acquired, as the timing when the reflected light R1 is missing.

Figure 5:
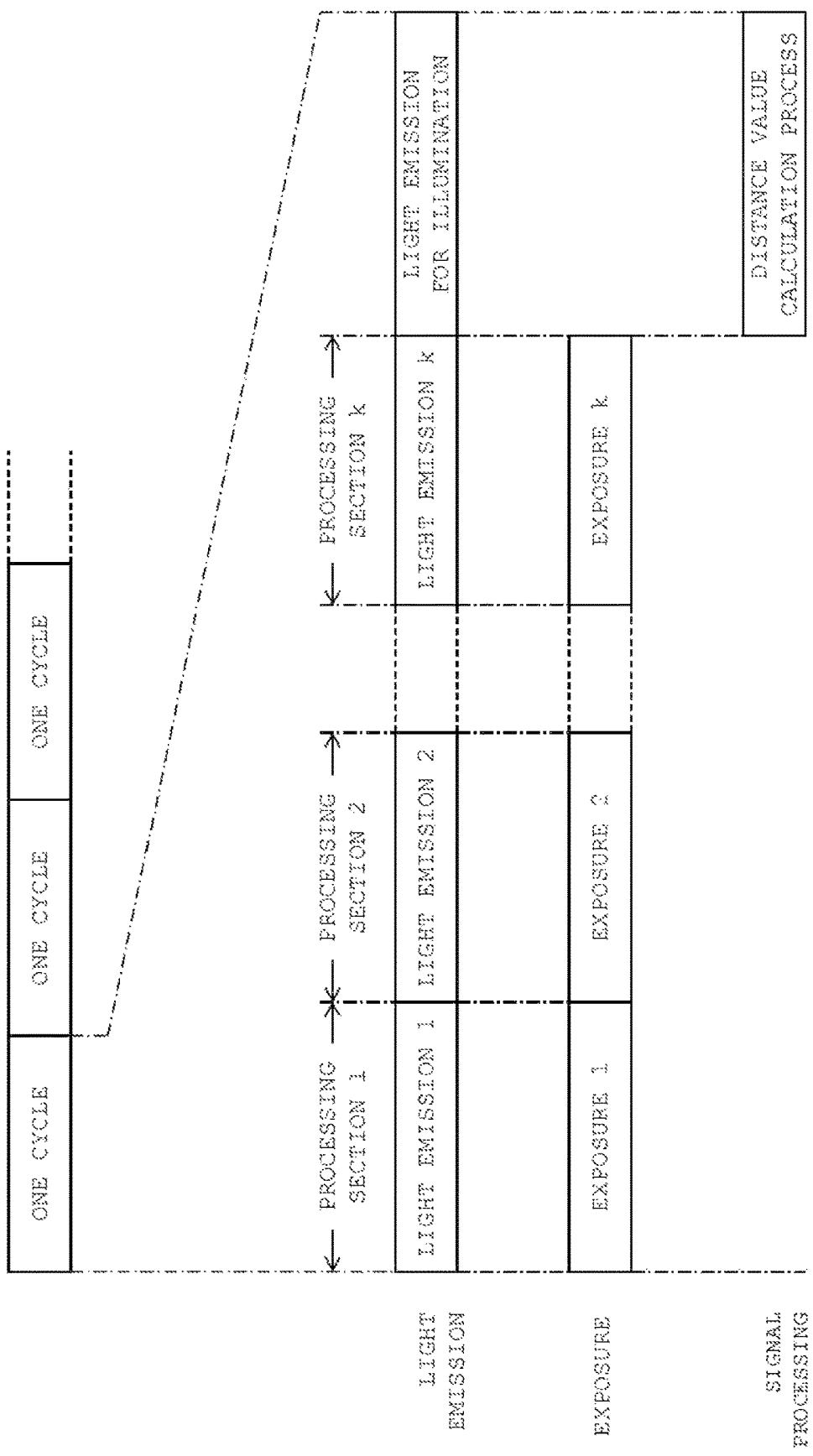
FIG. 5 is a timing chart illustrating light emission control of a light source and exposure control of an imaging element according to Embodiment 2.

FIG. 5 is a timing chart illustrating light emission control of the light source 110 and exposure control of the imaging element 121 according to Embodiment 2.

As shown in FIG. 5, in Embodiment 2, a cycle including processing sections 1 to k is repeatedly executed. In each processing section, light emission control on the light source 110 and exposure control on each pixel 121b of the imaging element 121 are performed. In each processing section, a combination of light emission and exposure is performed a plurality of times. A delay time of exposure with respect to light emission is the same in the same processing section, but different between the processing sections.

A distance value is acquired for each pixel 121b on the basis of detection signal values of each pixel 121b acquired in processing sections 1 to k. Following the final processing section k, light emission for illumination is performed. In the light emission for illumination, the illumination light L1 is continuously emitted from the light source 110. In the period of light emission for illumination, a process of calculating a distance value is performed on the basis of the detection signal values acquired for each pixel 121b one cycle before. The signal values in processing sections 1 to k acquired one cycle before are stored in the internal memory of the signal processing circuit 133.

FIG. 6A and FIG. 6B are timing charts showing light emission control of the light source 110 and exposure control of the imaging element 121 in processing section 1 and processing section k, respectively.

As shown in FIG. 6A, processing section 1 is divided into sections 1 to m. Sections 1 to m have the same time width. In the light emission control in processing section 1, a stop period ΔT1 is set at a fixed time position from the start timing of each of sections 1 to m. Similar to Embodiment 1 described above, the illumination light L1 is emitted in the period other than the stop period ΔT1, and the emission of the illumination light L1 is stopped in the stop period ΔT1. The stop period ΔT1 is, for example, about 10 nsec, and the time width of each section is, for example, about 10 μsec.

In the exposure control in processing section 1, an exposure period Et is set at a fixed time position from the start timing of each of sections 1 to m. Similar to Embodiment 1 described above, in the exposure period Et, the pixel 121b accepts incidence of the reflected light R1. The exposure period Et is, for example, about 10 nsec. The exposure period Et in processing section 1 is set at the time position delayed from the stop period ΔT1 in processing section 1 by the time corresponding to the minimum distance of the distance measurement range.

As shown in FIG. 6B, the light emission control in processing section k is the same as that in processing section 1. That is, the stop period ΔT1 in processing section k is set at the same timing as in processing section 1. On the other hand, the exposure period Et in processing section k is delayed by (m−1)T with respect to the exposure period Et in processing section 1. Here, similar to Embodiment 1 described above, T is a time width for shifting the exposure period Et with respect to the stop period ΔT1. Similar to Embodiment 1 described above, the time width T is set, for example, to be the same as that of the exposure period Et. The exposure period Et in section m is set at the time position delayed from the stop period ΔT1 in section m by the time corresponding to the maximum distance of the distance measurement range.

As described above, each exposure period Et in each processing section is set at the same time position with respect to the stop period ΔT1 in the same section, and is set at time positions different from each other, between different processing sections. In processing section 2, an exposure period Et is set at the time position delayed by the time width T with respect to the exposure period Et in processing section 1, and, in processing section 3, an exposure period Et is set at the time position further delayed by the time width T with respect to the exposure period Et in processing section 2. As described above, the exposure period Et shifts in the delay direction by the time width T each time the processing section changes. The stop period ΔT1 is uniformly set at the same time position in sections 1 to m of all the processing sections.

In this case, when an object exists in the irradiation region of the illumination light L1, the reflected light R1 is incident on the pixel 121b of the imaging element 121 at the timing when a delay time corresponding to the distance to the object elapses from the light emission. In other words, the missing period of the reflected light R1 due to the stop period ΔT1 occurs in each section at a delay timing corresponding to the distance to the object.

Therefore, in the processing section in which the time position of the exposure period Et is delayed from the stop period ΔT1 by the delay time corresponding to the distance to the object, in each of sections 1 to m, the exposure period Et coincides with a period in which the reflected light R1 is missing due to the stop period ΔT1, and the reflected light R1 is not received by the pixel 121b. Thus, in this processing section, a detection signal is not outputted from the pixel 121b. On the other hand, in the other processing sections in which the time position of the exposure period Et does not match the time position corresponding to the delay time of the reflected light R1, in each of sections 1 to m, the reflected light R1 is received by the pixel 121b, and a detection signal based on the reflected light R1 is outputted from the pixel 121b.

In Embodiment 2, a processing section in which the exposure period Et coincides with the period in which the reflected light R1 is missing due to the stop period ΔT1 is detected, and the distance to the object is measured on the basis of the time position of the exposure period Et in this processing section. Specifically, the values of the detection signal outputted from the pixel 121b in sections 1 to m are accumulated for each processing section, and a processing section in which the accumulated value that is the smallest and deviates from the other accumulated values is acquired is detected as the processing section in which the exposure period Et coincides with the period in which the reflected light R1 is missing due to the stop period ΔT1. Then, the distance value to the object is acquired for each pixel 121b on the basis of the time position of the exposure period Et in the detected processing section, that is, the time difference between the stop period ΔT1 and the exposure period Et.

In Embodiment 2 as well, similar to Embodiment 1, a table in which a processing section and a distance are associated with each other is stored in advance in the signal processing circuit 133. Accordingly, it is not necessary to calculate the distance to the object on the basis of the time difference between the stop period ΔT1 and the exposure period Et in each processing section, and the process can be simplified.

FIG. 7A is a flowchart showing a distance measurement process according to Embodiment 2. FIG. 7B is a diagram showing a configuration of a table which is referred to in distance measurement, according to Embodiment 2. Similar to FIG. 4A, the flowchart of FIG. 7A is executed for each pixel 121b.

The signal processing circuit 133 acquires the detection signal values in each processing section one cycle before, which are stored in the internal memory, for each pixel 121b from the memory (S21), and accumulates the acquired detection signal values for each processing section (S22). Next, the signal processing circuit 133 obtains a minimum value TSm of the accumulated values acquired for the respective processing sections (S23), and further acquires an average value TSa from the accumulated values other than the minimum value TSm (S24). Then, the signal processing circuit 133 determines whether the difference between the acquired average value TSa and the acquired minimum value TSm is greater than a threshold TSth (S25).

When the difference between the average value TSa and the minimum value TSm is greater than the threshold TSth (S25: YES), the signal processing circuit 133 determines the timing of exposure in the processing section in which the minimum value TSm is acquired, as the timing when the reception of the reflected light R1 is missing, and acquires a distance value to the object (S26). Here, the table shown in FIG. 7B in which processing sections 1 to k and distance values D1 to Dk are associated with each other is stored in advance in the signal processing circuit 133. In the process in step S26, the signal processing circuit 133 reads the distance value corresponding to the processing section in which the minimum value TSm is acquired, from the table, and sets the acquired distance value as a distance value of the pixel 121b to be processed.

On the other hand, when the difference between the average value TSa and the minimum value TSm is equal to or less than the threshold TSth (S25: NO), the signal processing circuit 133 sets NULL indicating infinity, for the pixel 121b to be processed (S27). Then, one cycle of the distance measurement process is completed. When detection signal values are acquired for the next processing section 1 to processing section k, the signal processing circuit 133 returns the process to step S21 and executes the same process.

In this case as well, the distance values for one frame acquired for each pixel 121b by the process of FIG. 7A are transmitted to the control unit on the vehicle 10 side via the communication interface 134 every cycle. On the vehicle 10 side, predetermined control is performed on the vehicle 10 on the basis of the received distance values.

Effects of Embodiment 2

In the distance measurement device 100 according to Embodiment 2 as well, the same effects as those of Embodiment 1 can be achieved. Specifically, a period (stop period ΔT1) in which the illumination light L1 is stopped for distance measurement can be reduced to be a short period, and thus distance measurement can be smoothly performed while applying a sufficient amount of the illumination light L1.

Moreover, in the configuration of Embodiment 2, the effect that the measurement accuracy of the distance value for each pixel 121b can be improved as compared to Embodiment 1 can be achieved as follows.

That is, in the configuration of Embodiment 2, the emission of the illumination light L1 is stopped at a fixed timing in each of sections 1 to m each having a predetermined cycle, the timing of exposure of each pixel 121b is fixed in each processing section including a plurality of sections 1 to m, but is changed between the processing sections, and the distance to the object is measured for each pixel 121b of the imaging element 121 on the basis of the values of the signal outputted from each pixel 121b in each processing section as a result of the exposure.

Specifically, the signal processing circuit 133 accumulates the signal values of each pixel 121b for each of processing sections 1 to k to obtain an accumulated value, and the distance to the object is measured for each pixel 121b on the basis of the accumulated value of each of processing sections 1 to k.

More specifically, the signal processing circuit 133 determines the processing section in which one accumulated value (minimum value TSm) that is the smallest and deviates from the other accumulated values is acquired, as the processing section in which the reception of the reflected light R1 is missing. In the configuration shown in FIG. 7A, the processing section in which one accumulated value (minimum value TSm) that is the smallest and whose difference from the average value TSa of the other accumulated values exceeds the predetermined threshold TSth, is determined as the processing section in which the reception of the reflected light R1 is missing.

By comparing the accumulated values each obtained by accumulating a plurality of detection signal values as described above, erroneous detection of the processing section corresponding to the missing timing of the reflected light R1 can be more reliably prevented, so that the measurement accuracy of the distance value can be improved.

For example, in the case where the distance to the object is long, the amount of the reflected light R1 incident on the pixel 121b is significantly decreased. That is, the amount of the reflected light R1 incident on the pixel 121b is inversely proportional to the square of the distance to the object. Therefore, in the case where the distance to the object is long, the difference between the detection signal value detected in the exposure period Et whose time position coincides with the timing when the reflected light R1 is missing, and the detection signal value detected in each of the other exposure periods Et, becomes much smaller.

Therefore, in the case where a combination of the stop period ΔT1 and the exposure period Et delayed from the stop period ΔT1 by the time corresponding to the distance value is set once per cycle as in Embodiment 1 described above, the exposure period Et whose time position does not coincide with the timing in which the reflected light R1 is missing may be erroneously detected, due to the influence of unnecessary light, etc., as the exposure period Et at the timing when the reflected light R1 is missing.

On the other hand, in Embodiment 2, since the accumulated value of detection signal values acquired for the exposure periods Et of a plurality of times (m times) is used for obtaining a distance value, the difference between the accumulated value for the exposure period Et whose time position coincides with the timing when the reflected light R1 is missing and the accumulated value for each of the other exposure periods Et becomes greater. Accordingly, even in the case where the distance to the object is long, the processing section in which the reflected light R1 is not missing can be reliably prevented from being erroneously detected as the processing section in which the reflected light R1 is missing. As a result, the measurement accuracy of the distance value for each pixel 121b can be improved.

In the process of FIG. 7A, the accumulated value of the detection signal values is obtained for each processing section, but, instead of the accumulated value, a value which is referred to in distance measurement may be acquired by other arithmetic processing. For example, instead of simply accumulating the detection signal values in each processing section, a value obtained by accumulating values obtained by multiplying the respective detection signal values by a predetermined value may be acquired for each processing section.

In the process of FIG. 7A, the average value TSa of the other accumulated values is used for determining whether the minimum value TSm of the accumulated values deviates from the other accumulated values, but the determination of deviation may be performed using another value. For example, whether the minimum value TSm deviates from the other accumulated values may be determined by comparing the minimum value TSm with the average value of some of the other accumulated values. In addition, the threshold TSth may be set to a value with which it can be appropriately determined that the minimum value TSm is generated due to missing of the reflected light R1.

Embodiment 3

In Embodiments 1 and 2 described above, the distance measurement process in a state where the illumination light L1 is projected, such as during travelling at night, has been described. However, in Embodiment 3, a distance measurement process in a state where the illumination light L1 is not projected, such as during daytime travelling, will be described.

Figure 8:
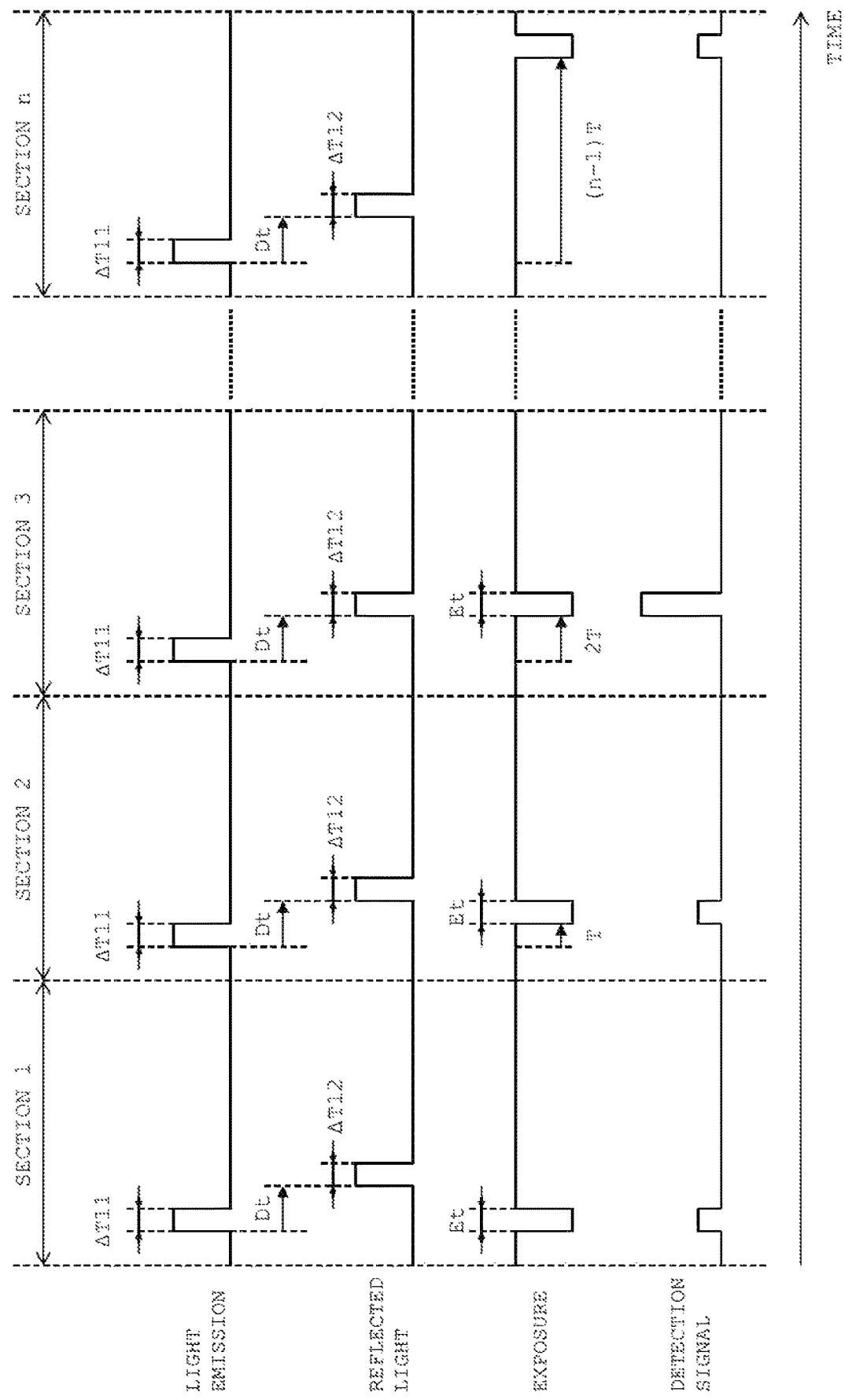
FIG. 8 is a timing chart illustrating light emission control of a light source and exposure control of an imaging element according to Embodiment 3.

FIG. 8 is a timing chart illustrating light emission control of the light source 110 (LEDs 111) and exposure control of the imaging element 121 according to Embodiment 3.

In Embodiment 3, the signal processing circuit 133 raises a drive signal to a high level for a projection period ΔT11 at a timing when a fixed time elapses from the start of each section. In this case, only in the projection period ΔT11, the illumination light L1 is projected to a projection region. When an object exists in the projection region, the reflected light R1 is received by pixels on which the object is projected. A reception period ΔT12 of the reflected light R1 is the timing delayed from the projection period ΔT11 by the delay time Dt corresponding to the distance to the object.

The signal processing circuit 133 sets an exposure period Et at the same timing as in FIG. 3, for sections 1 to n. Accordingly, in a section in which the reception period ΔT12 and the exposure period Et match each other, a high-level detection signal is generated. In Embodiment 3, since daytime operation is assumed, a low-level detection signal is generated due to incidence of the ambient light even in any section in which the reception period ΔT12 and the exposure period Et do not match each other. In the example of FIG. 8, in section 3, the reception period ΔT12 and the exposure period Et match each other, and thus a high-level detection signal is generated, and, in the other sections, a low-level detection signal based on the ambient light is generated.

Therefore, in Embodiment 3, the time width 2T can be grasped by specifying section 3 in which the high-level detection signal is obtained, and thus the distance to the object can be obtained. In this case as well, similar to Embodiment 1 described above, the signal processing circuit 133 acquires the distance to the object by referring to a table in which a section and a distance are associated with each other.

Figure 9:
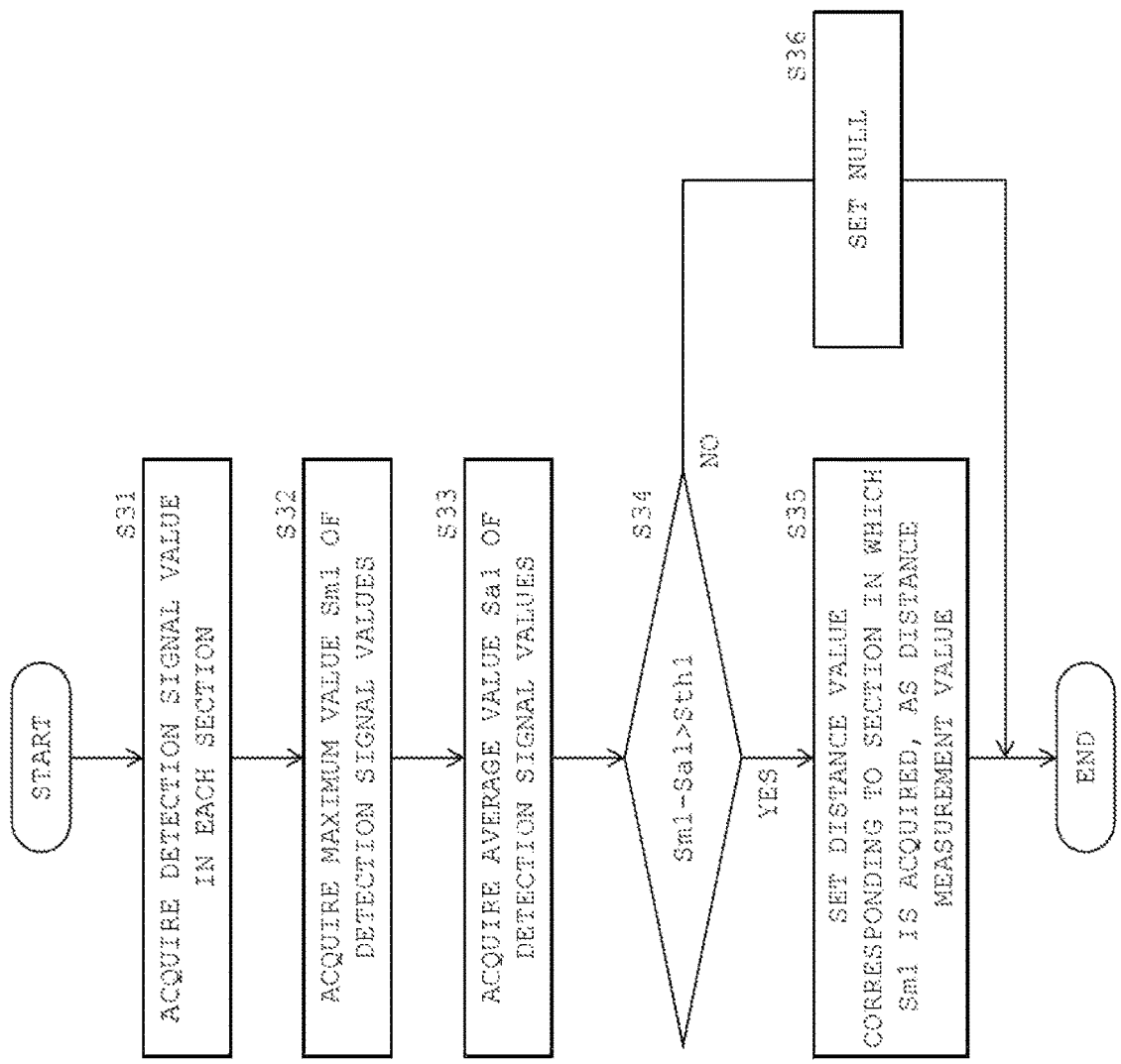
FIG. 9 is a flowchart showing a distance measurement process according to Embodiment 3.

FIG. 9 is a flowchart showing a distance measurement process according to Embodiment 3. The flowchart of FIG. 9 is also executed for each pixel 121b.

In control in section 1 to section n, the signal processing circuit 133 acquires detection signal values of each pixel 121b in the respective sections, and stores the acquired detection signal values in the internal memory. Thereafter, the signal processing circuit 133 acquires the detection signal values in the respective sections for each pixel 121b from the memory (S31), and acquires a maximum value Sm1 of the acquired detection signal values (S32). Furthermore, the signal processing circuit 133 acquires an average value Sa1 from the detection signal values other than the maximum value Sm1 (S33), and determines whether the difference between the maximum value Sm1 and the average value Sa1 is greater than a threshold Sth1 (S34).

When the difference between the maximum value Sm1 and the average value Sa1 is greater than the threshold Sth1 (S34: YES), the signal processing circuit 133 determines the timing of exposure in the section in which the maximum value Sm1 is acquired, as the timing when the reception of the reflected light R1 occurs, and acquires the distance value to the object (S35). Here, a distance value is acquired from a table similar to that of FIG. 4B. The signal processing circuit 133 sets the acquired distance value as a distance value of the pixel 121b to be processed.

On the other hand, when the difference between the maximum value Sm1 and the average value Sa1 is equal to or less than the threshold Sth1 (S34: NO), the signal processing circuit 133 sets NULL indicating infinity, for the pixel 121b to be processed (S36). Then, one cycle of the distance measurement process is completed. When detection signal values are acquired for the next section 1 to section n, the signal processing circuit 133 returns the process to step S31 and executes the same process.

According to Embodiment 3, distance measurement can be performed even in a situation where the illumination light L1 is not projected, such as during daytime.

In Embodiment 3 as well, similar to Embodiment 2 described above, distance measurement may be performed using a plurality of processing sections each including sections 1 to n. In this case, in the flowchart of FIG. 7A, the process in step S23 is changed to a process of acquiring the maximum value of the accumulated values, and the process in step S24 is replaced with a process of averaging the accumulated values other than the maximum value. Furthermore, step S25 is replaced with a process of determining whether the difference between the maximum value of the accumulated values and the average value of the accumulated values exceeds a threshold. Accordingly, the accuracy of distance measurement can be improved as compared to that in the process of FIG. 9.

The distance measurement process (daytime mode) in Embodiment 3 and the distance measurement process (night mode) in Embodiments 1 and 2 described above may be automatically switched in accordance with the ambient brightness. In this case, whether the ambient brightness has changed to a situation for switching between these modes may be determined on the basis of detection signals acquired in sections 1 to n.

FIG. 10A is a diagram schematically showing change of a detection signal when the surroundings become bright, for example, due to dawn or the like, in a situation where the night mode is set. In FIG. 10A, for convenience, only sections 2 to 4 among the above sections 1 to n are shown. Here, in section 3, the missing period ΔT2 and the exposure period Et match each other.

The left side of FIG. 10A shows a situation of the detection signal when the surroundings are still dark. In this case, in section 3, since the missing period ΔT2 and the exposure period Et match each other, a detection signal is not generated.

The right side of FIG. 10A shows a situation of the detection signal when the surroundings become bright. In this case, an increase in the detection signal based on the ambient light occurs in all the sections. Therefore, even in section 3 in which the detection signal value is the smallest, a detection signal based on the ambient light is generated. Thus, in the night mode, whether the surroundings have become bright can be determined by comparing the minimum detection signal value among the detection signal values in the respective sections with a threshold Th1. The threshold Th1 can be set to a value substantially equal to the minimum value of the detection signal values when the ambient brightness reaches a brightness at which the headlight can be turned off.

FIG. 10B is a diagram schematically showing change of a detection signal when the surroundings become dark, for example, due to dusk or the like, in a situation where the daytime mode is set. In FIG. 10B, for convenience, only sections 2 to 4 among the above sections 1 to n are shown. Here, in section 3, the reception period ΔT12 and the exposure period Et match each other.

The left side of FIG. 10B shows a situation of the detection signal when the surroundings are still bright. In this case, in section 3, since the reception period ΔT12 and the exposure period Et match each other, the level of the detection signal becomes high, and, in the other sections, the level of the detection signal becomes low (a level corresponding to the ambient light).

The right side of FIG. 10B shows a situation of the detection signal when the surroundings become dark. In this case, since the ambient light is reduced, the level of the detection signal is significantly decreased in the sections other than section 3 in which the detection signal value is the largest. Thus, in the daytime mode, whether the surroundings have become dark can be determined by comparing the detection signal values other than the maximum detection signal value among the detection signal values in the respective sections with a threshold Th2. The threshold Th2 can be set to a value substantially equal to another detection signal value when the ambient brightness reaches a brightness at which it is necessary to turn on the headlight.

Figure 11:
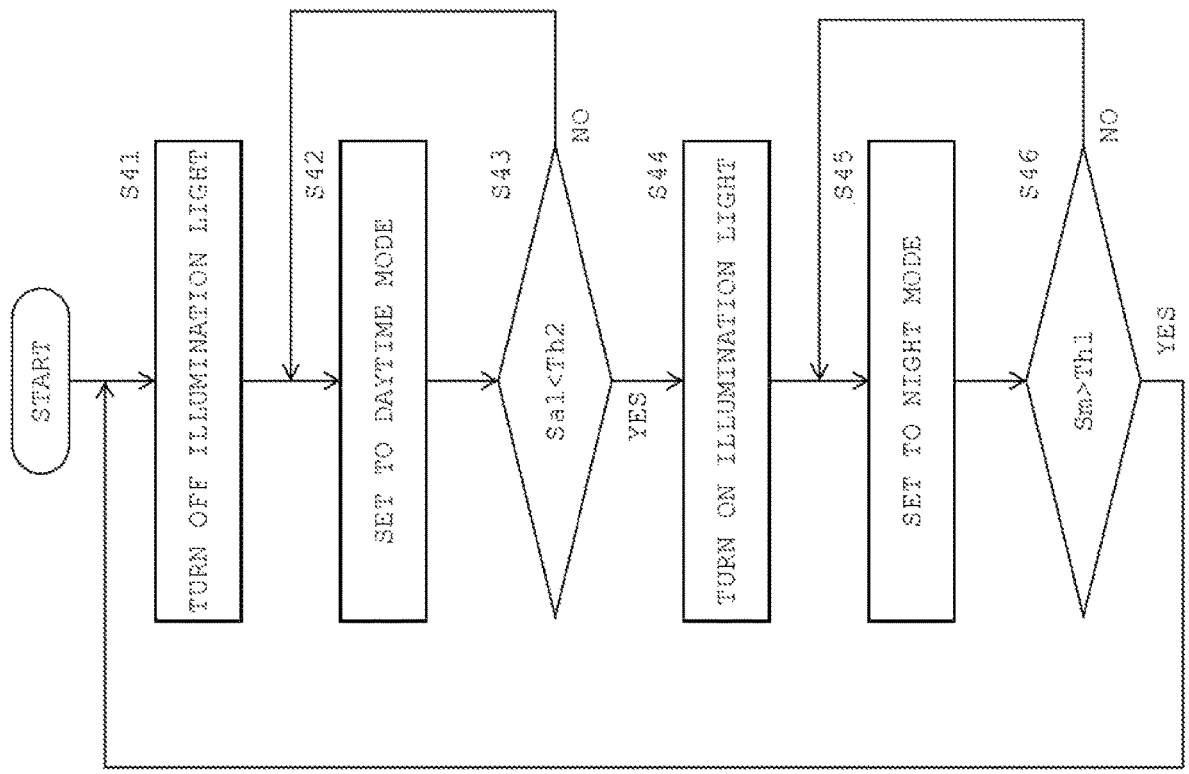
FIG. 11 is a flowchart showing control to switch between the daytime mode and the night mode according to Embodiment 3.

FIG. 11 is a flowchart showing control to switch between the daytime mode and the night mode.

When the engine of the vehicle starts, the signal processing circuit 133 turns off the illumination light L1 (S41), and sets the distance measurement mode to the daytime mode (S42). Next, the signal processing circuit 133 determines whether the average value Sa1 acquired during execution of the daytime mode, that is, the average value of the detection signal values other than the maximum value among the detection signal values acquired in the respective sections, is smaller than the threshold Th2 (S43). When the average value Sa1 is equal to or greater than the threshold Th2 (S43: NO), the signal processing circuit 133 continues the daytime mode (S42).

On the other hand, when the average value Sa1 is smaller than the threshold Th2 (S43: YES), the signal processing circuit 133 performs a process of switching the distance measurement mode to the night mode. In this case, the signal processing circuit 133 turns on the illumination light L1 (S44), and sets the distance measurement mode to the night mode (S45). Thereafter, the signal processing circuit 133 determines whether the minimum value Sm acquired during execution of the night mode, that is, the minimum value among the detection signal values acquired in the respective sections, is greater than the threshold Th1 (S46). When the minimum value Sm is equal to or less than the threshold Th1 (S46: NO), the signal processing circuit 133 continues the night mode (S45). On the other hand, when the minimum value Sm is greater than the threshold Th1 (S46: YES), the signal processing circuit 133 returns the process to step S41 and performs a process of switching the distance measurement mode to the daytime mode.

According to this configuration, the distance measurement mode can be automatically switched between the daytime mode and the night mode while automatically switching the illumination light L1 on/off in accordance with the ambient brightness. Therefore, the convenience of the driver can be improved.

Moreover, since a change in ambient brightness is determined on the basis of the detection signals acquired during execution of the daytime mode and the night mode, it is not necessary to additionally provide a sensor for detecting the ambient brightness. Therefore, the distance measurement mode can be switched between the daytime mode and the night mode with a simple configuration and processing.

However, this effect does not necessarily exclude the provision of an illuminance sensor for detecting the ambient brightness.

In the flowchart of FIG. 11, the distance measurement process in Embodiment 1 is applied as the night mode in step S45, but the distance measurement process in Embodiment 2 may be applied as the night mode in step S45. Similarly, the distance measurement process of the daytime mode corresponding to Embodiment 2 may be applied as the daytime mode in step S42.

Moreover, in step S43 of FIG. 11, the average value Sa1 of the detection signals acquired in all the sections (unmatched sections) other than the section (matched section) in which the reception period ΔT12 of the reflected light of the illumination light L1 and the exposure period Et match each other is used for determination as to the ambient brightness, but the average value in all the unmatched sections does not necessarily have to be used for determination as to the ambient brightness. For example, the detection signal value acquired in one of the unmatched sections may be used for determination as to the ambient brightness, or the average value of the detection signal values acquired in several unmatched sections around the matched section may be used for determination as to the ambient brightness.

<Modifications>

In Embodiments 1 and 2 described above, the emission of the illumination light L1 is reduced by stopping the emission of the illumination light L1. However, the emission of the illumination light L1 may be reduced by lowering the emission level of the illumination light L1 as compared to that during normal illumination operation. For example, in the period corresponding to the above-mentioned stop period ΔT1, the emission level of the illumination light L1 may be lowered to about ⅕ to 1/10 of that during normal illumination operation. In this case, for example, the reflected light is received even in the missing period ΔT2 of FIG. 3, and a detection signal based on the reflected light is generated even in section 3 in which the missing period ΔT2 and the exposure period Et match each other. However, in this case as well, the detection signal generated in section 3 is significantly lowered as compared to the detection signals generated in the other sections. Therefore, the time width 2T can be grasped by specifying section 3 in which the detection signal is lowered, and thus the distance to the object can be obtained.

Figure 4:
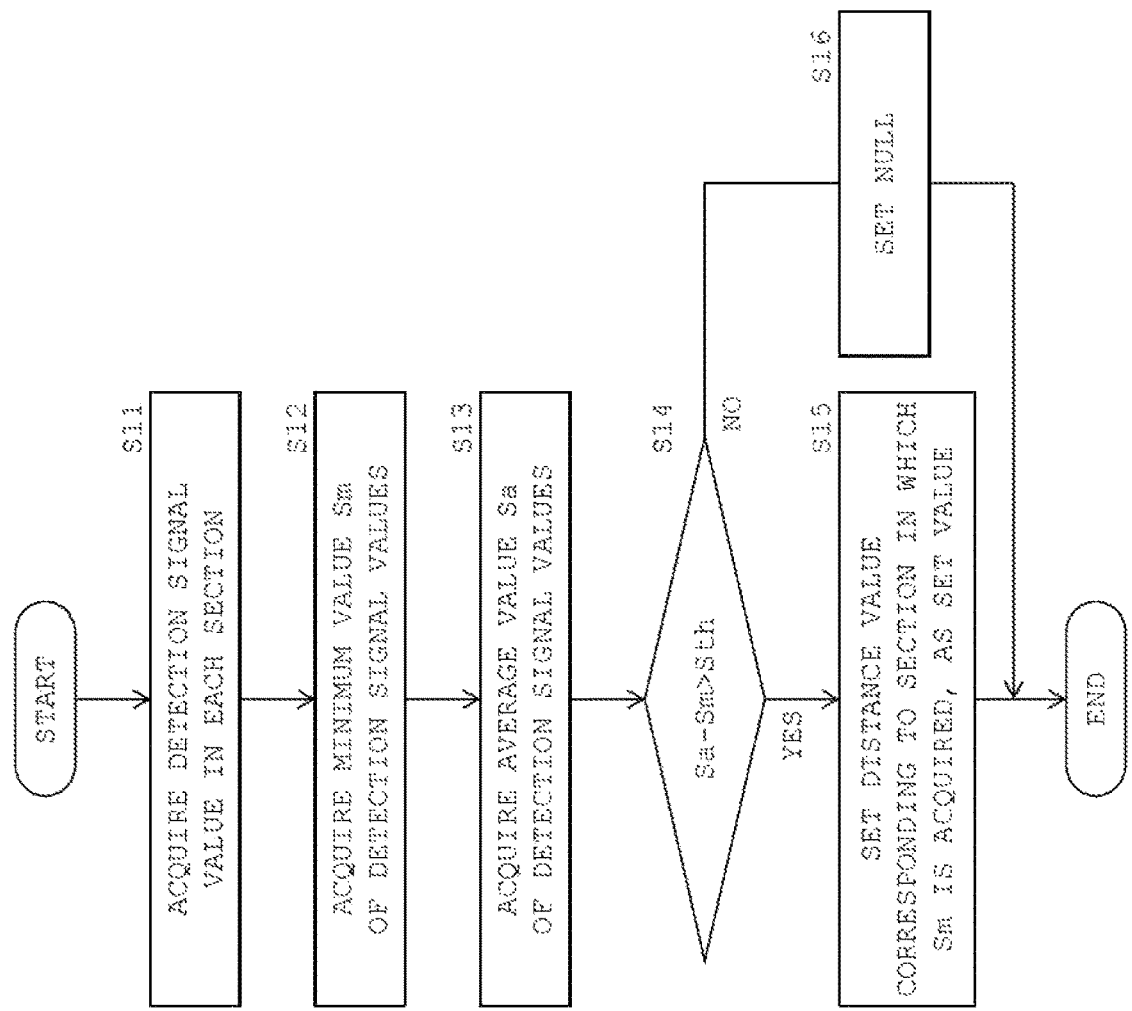
FIG. 4A is a flowchart showing a distance measurement process according to Embodiment 1.
FIG. 4B is a diagram showing a configuration of a table which is referred to in distance measurement according to Embodiment 1.

In this case, the difference between the average value Sa and the minimum value Sm in step S14 of FIG. 4 is smaller than that in the case of Embodiment 1 described above.

Therefore, in this case, the threshold Sth in step S14 may be set such that the section in which the detection signal is lowered can be appropriately specified on the basis of the difference. In addition, in Embodiment 2 as well, in the case where the emission of the illumination light L1 is reduced by lowering the emission level of the illumination light L1 as compared to that during normal illumination operation, the threshold TSth in step S25 of FIG. 7A may be set such that the section in which the detection signal is lowered can be appropriately specified on the basis of the difference between the average value TSa and the minimum value TSm.

Figure 12B:
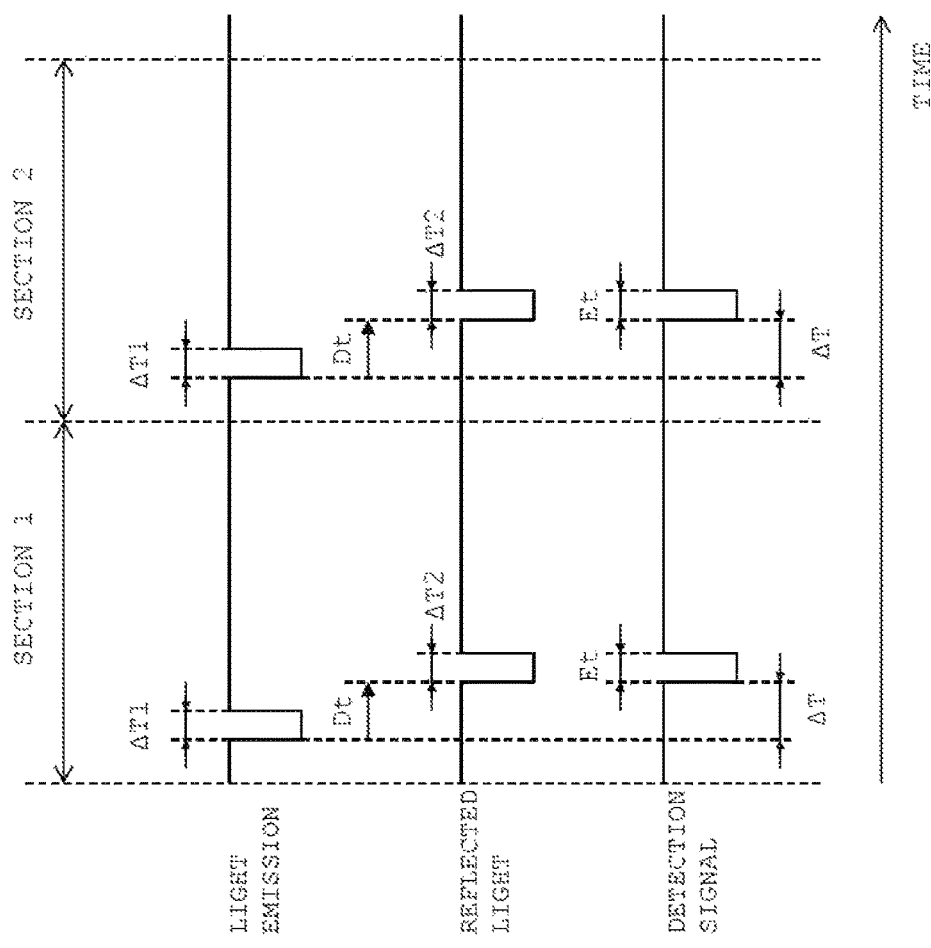
FIG. 12B is a timing chart showing a distance measurement process according to another modification.
Figure 12A:
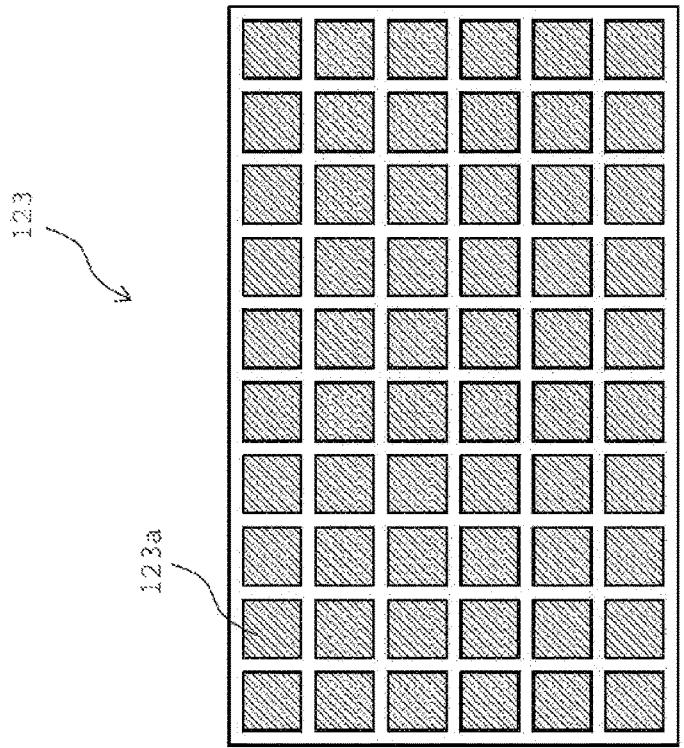
FIG. 12A schematically shows a configuration of a photodetector according to a modification.

In Embodiments 1 and 2 described above, the imaging element 121 is used as the photodetector, but the photodetector used for distance measurement is not limited thereto. For example, a photodetector 123 in which a plurality of sensors 123a (detection regions) are arranged in a matrix as shown in FIG. 12A may be used instead of the imaging element 121. In this case, for example, in the exposure period Et in Embodiments 1 and 2 described above, the value of the detection signal outputted from each sensor 123a may be acquired, and the same process as described above may be performed on the basis of the acquired detection signal value.

It should be noted that the imaging element 121 has a higher resolution than the photodetector 123 of FIG. 12A. Therefore, in order to increase the spatial resolution of the distance value, it is preferable to perform distance measurement using the imaging element 121 as in Embodiments 1 and 2 described above.

In Embodiments 1 and 2 described above, by shifting the exposure period Et, the missing timing of the reflected light R1 is detected, and the distance to the object is measured on the basis of the detection result. However, the method for measuring the distance to the object is not necessarily limited thereto. For example, in the case where the photodetector 123 of FIG. 12A is used, the distance to the object may be obtained on the basis of a time difference ΔT between a falling timing of the detection signal of each sensor 123a and a start timing of the stop period ΔT1 as shown in FIG. 12B.

In Embodiments 1 and 2 described above, the visible light is emitted as the illumination light L1 from the light sources 110. However, it is sufficient that the illumination light L1 emitted from the light sources includes visible light, and, for example, invisible light such as infrared light may be included in the illumination light L1 together with visible light.

In Embodiments 1 and 2 described above, the distance measurement device 100 is mounted on the vehicle 10, but the apparatus on which the distance measurement device 100 is mounted is not limited thereto. For example, the distance measurement device 100 may be used for spotlights for crime prevention.

In addition to the above, various modifications can be made as appropriate to the embodiments of the present invention, without departing from the scope of the technological idea defined by the claims.

What is claimed is:

1. A distance measurement device comprising:
   a light source configured to emit illumination light including visible light;
   a photodetector configured to receive reflected light of the illumination light from an object; and
   a signal processing circuit configured to control the light source and measure a distance to the object on the basis of an output from the photodetector,
   wherein the signal processing circuit causes the light source to continuously emit the illumination light at a first level, reduces the emission of the illumination light from the first level to a second level in a pulsed manner in a predetermined period, and measures a distance to the object on the basis of a timing when the reception of the reflected light at the photodetector is reduced in a pulsed manner due to the reduction of the illumination light in the predetermined period,
   wherein the photodetector is an imaging element, and the signal processing circuit performs measurement of the distance for each of pixels of the imaging element, and
   wherein the signal processing circuit
   reduces the emission of the illumination light at a first time instance in each time section of a plurality of time sections, the first time instance being a same in each time interval,
   exposes each pixel at different time instances in each time section of the plurality of time sections, wherein a time instance in each time section is delayed from a time section in an immediately preceding time section by a same time width, and
   measures the distance to the object for each of the pixels of the imaging element on the basis of a value of a signal outputted from each of the pixels in each time section as a result of the exposure.

2. The distance measurement device according to claim 1, wherein
   the photodetector includes a plurality of detection regions demarcated from each other, and
   the signal processing circuit performs measurement of the distance based on a reduction in the reception of the reflected light, for each of the detection regions.

3. The distance measurement device according to claim 1, wherein
   the signal processing circuit determines the time section in which one value of the signal that is smallest and deviates from other values of the signal is acquired, as the time section in which the reception of the reflected light is reduced, and measures the distance to the object.

4. The distance measurement device according to claim 3, wherein
   the signal processing circuit determines the time section in which one value of the signal that is smallest and whose difference from an average value of the other values of the signal exceeds a predetermined threshold is acquired, as the time section in which the reception of the reflected light is reduced, and measures the distance to the object.

5. The distance measurement device according to claim 1, wherein
   the signal processing circuit reduces the emission of the illumination light at a fixed timing in each of time sections each having a predetermined cycle, fixes a timing of exposure of each of the pixels in each of processing time sections each including a plurality of the time sections, changes the timing of exposure between the processing time sections, and measures the distance to the object for each of the pixels of the imaging element on the basis of a value of a signal outputted from each of the pixels in each of the processing time sections as a result of the exposure.

6. The distance measurement device according to claim 5, wherein
the signal processing circuit obtains an accumulated value by accumulating values of the signal of each of the pixels for each of the processing time sections, and measures the distance to the object on the basis of the accumulated value for each of the processing time sections.

7. The distance measurement device according to claim 6, wherein
the signal processing circuit determines the processing time section in which one accumulated value that is smallest and deviates from other accumulated values is acquired, as the processing time section in which the reception of the reflected light is reduced, and measures the distance to the object.

8. The distance measurement device according to claim 7, wherein
the signal processing circuit determines the processing time section in which one accumulated value that is smallest and whose difference from an average value of the other accumulated values exceeds a predetermined threshold is acquired, as the processing time section in which the reception of the reflected light is reduced, and measures the distance to the object.

9. The distance measurement device according to claim 1, wherein
the distance measurement device is installed in a moving body, and
the illumination light is used as light for illuminating the front of the moving body.

10. The distance measurement device according to claim 9, wherein the signal processing circuit includes:
a night mode in which the emission of the illumination light is reduced in the predetermined period while using the illumination light as the light for illuminating the front of the moving body, and the distance to the object is measured on the basis of a timing when the reception of the reflected light is reduced due to the reduction of the emission of the illumination light; and
a daytime mode in which the illumination light is emitted in a predetermined period from a state where the emission of the illumination light is stopped, and the distance to the object is measured on the basis of a timing when the reception of the reflected light occurs as a result of the emission of the illumination light.

11. The distance measurement device according to claim 10, wherein the signal processing circuit switches between the night mode and the daytime mode on the basis of ambient brightness of the moving body.

12. The distance measurement device according to claim 10, wherein, during execution of the night mode, the signal processing circuit switches a distance measurement mode from the night mode to the daytime mode on the basis of a detection signal outputted from the photodetector at a timing when the reception of the reflected light is reduced due to the reduction of the emission of the illumination light.

13. The distance measurement device according to claim 10, wherein, during execution of the daytime mode, the signal processing circuit switches a distance measurement mode from the daytime mode to the night mode on the basis of a detection signal outputted from the photodetector at a timing other than a timing when the reception of the reflected light occurs as a result of the emission of the illumination light.

14. The distance measurement device according to claim 10, wherein
the signal processing circuit switches the light source from an ON state to an OFF state when switching a distance measurement mode from the night mode to the daytime mode, and
the signal processing circuit switches the light source from an OFF state to an ON state when switching the distance measurement mode from the daytime mode to the night mode.

\* \* \* \* \*